Sept. 14, 1965     D. M. PETERSON     3,205,801

CAMERA FOR FLASH PHOTOGRAPHY

Filed Feb. 28, 1963     3 Sheets-Sheet 1

DEAN M. PETERSON
INVENTOR.

BY
ATTORNEYS

Sept. 14, 1965 D. M. PETERSON 3,205,801
CAMERA FOR FLASH PHOTOGRAPHY
Filed Feb. 28, 1963 3 Sheets-Sheet 3

DEAN M. PETERSON
INVENTOR.

BY
ATTORNEYS

United States Patent Office 3,205,801
Patented Sept. 14, 1965

3,205,801
CAMERA FOR FLASH PHOTOGRAPHY
Dean M. Peterson, Rochester, N.Y., assignor to Eastman Kodak Company, Rochester, N.Y., a corporation of New Jersey
Filed Feb. 28, 1963, Ser. No. 261,662
8 Claims. (Cl. 95—11.5)

This invention relates generally to cameras, and more specifically to an improved camera adapted for daylight and flash photography.

This camera is an improvement over the type disclosed in U.S. Patent No. 3,051,066, issued to Lareau et al., on August 28, 1962. One of the disadvantages of the Lareau camera is the utilization therein of a rigid stop member for intercepting the movable shutter blade to obtain different shutter speeds. When the rapidly-moving shutter blade strikes the rigid stop member, considerable camera shock results causing possible damage to some of the more delicate camera parts, and movement of the camera resulting in blurred pictures.

These disadvantages are obviated in this camera by utilizing a spring stop member which not only absorbs the shock of the fast-moving blade, but in addition is tensioned thereby to aid in returning the blade to its original position. Moreover, the spring member may be readily manufactured from equipment which by minor adjustment will produce spring members capable of achieving accurate exposure times varying between 1/60 to 1/100 seconds. Movement of the spring member between its different positions is responsive to an improved retractable flash holder which in moving between extended and retracted positions move the spring member between an operative position in which it is in the path of movement of the shutter blade to be engaged thereby, and an inoperative position in which it is out of the path of movement of the blade, respectively.

One of the primary objects of the present invention is to provide an improved camera having a spring member movable relative to a movable part of a shutter for varying the shutter speed.

Another object of this invention is to provide an improved camera having a movable spring member responsive to the movement of a flash holder between retracted and extended positions relative to the camera body for varying the shutter speed.

Another object of this invention is to provide an improved camera of simple design and construction, thoroughly reliable and efficient in operation, and economical to manufacture.

Another object of this invention is to provide a camera having a flash-lamp circuit including a retractable flash holder that is movable into and out of engagement with a switch contact carried by the shutter trigger.

Another object of this invention is to provide a camera having an improved flash holder.

The above and other objects and advantages will be apparent from the following description when read in connection with the accompanying drawings, in which:

FIG. 4 is a top plan view of the camera of FIG. 2;

FIG. 5 is a vertical sectional view taken along line 5—5 of FIG. 3;

FIG. 6 is the rear elevation view of the flash holder per se;

FIG. 7 is a vertical sectional view taken on line 7—7 of FIG. 6;

FIG. 8 is a bottom plan view of the flash holder of FIG. 6;

Figure 3:
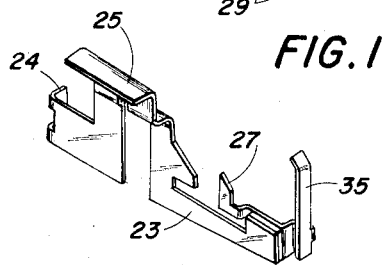
FIG. 3 is a side elevation view of the shutter trip member of FIG. 1.

As shown in the drawings, this invention is embodied in a camera 14 having a body 15 to which a mounting plate 16 is secured. The plate 16 supports a pivotal shutter blade 17 which is biased by a spring 18 into engagement with a stop 19 on plate 16. The shutter blade 17 has a lug 21 which is struck by a tensioned striking lever 22, when released, to impart a clockwise swinging movement to shutter blade 17 against the bias of its spring 18 to make an exposure of a predetermined duration. The mechanism including lever 22 for striking shutter blade 17 may be of any known type, and since it does not form a part of the invention other than in an environmental capacity, it has not been shown or described in complete detail. A shutter trip member 23 (see FIG. 3) has one end pivotally secured to plate 16 at 24, and may be manually moved in a clockwise direction by a finger button 25 against the bias of a spring 26 to release the shutter. The trip member 23 has an arm 27 which in the normal position of trip member 23 holds the tensioned striking lever 22 in a cocked position. When trip member 23 is depressed to release the shutter, arm 27 releases lever 22 which strikes lug 21 imparting a clockwise swinging movement to shutter blade 17. The shutter striking lever may be moved to its cocked or tensioned position in any known manner, e.g., by a separate cocking member, by the film advancing mechanism at the time a film is advanced, set, and which is not illustrated since it forms no part of the present invention.

Figure 1:
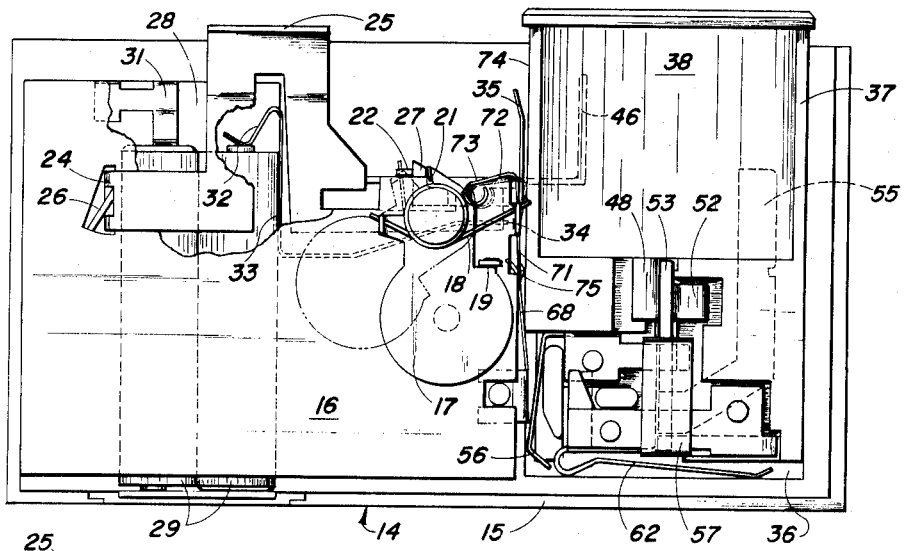
FIG. 1 is a front elevation view of the camera of this invention, with its cover plate removed, showing the flash holder in its retracted position, and having a portion broken away to show the battery holder and circuit contacts.

The camera body 15 as seen in FIG. 1 has a battery compartment 28 in which any suitable battery or batteries 29 may be placed. A battery terminal of one polarity engages a contact member 31 which is secured to mounting plate 16. Another battery terminal of the opposite polarity engages one end 32 of a contact member 33 which is rigidly secured to body 15 at a point intermediate its ends. The opposite end 34 of contact member 33 is free and functions as a leaf spring which is normally out of engagement with a contact member 35, secured to but insulated from the end of shutter trip member 23 (see FIG. 3). When shutter trip member 23 is depressed to make an exposure, contact member 33 is moved into engagement with leaf spring 34.

Figure 11:
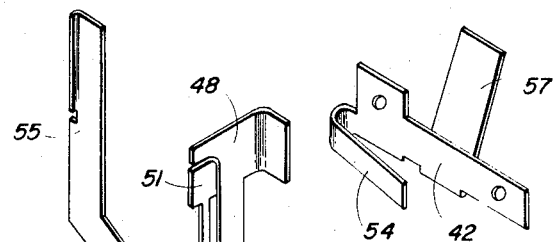
FIGS. 9–11 are perspective views of the brackets mounted on the flash holder.
Figure 10:
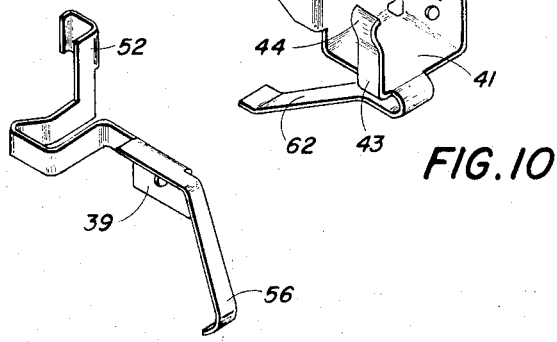
Figure 9:

The camera body 15 further has another compartment 36 for slidably supporting a flash holder 37. The flash holder 37 has a semi-cylindrical reflector 38 of any suitable type, and further supports a plurality of brackets 39, 41, 42 of the form shown in FIGS. 9–11. The bracket 41 of FIG. 10 has a spring element 43 having a bent end 44 adapted to extend through a slot 45 (see FIGS. 4 and 5) in compartment 36 into engagement with a notch 46' in flange 46 of plate 16 for electrically connecting plate 16 to bracket 41, and for releasably holding the flash holder 37 in its extended position. The spring element 43 also engages the back side 47 (see FIG. 5) of compartment 36 to eliminate any front-to-back end play of flash holder 37. The bracket 41 further has a spring arm 48 extending upwardly into a notch 49 (see FIG. 6) in flash holder 37 and having a spring contact 51 that engages one terminal of a flash lamp (not shown) that is inserted into the lamp socket of the flash holder 37. The bracket 39 of FIG. 9 is secured to flash holder 37 and has a spring arm 52 thereof forming a contact member for engaging the other terminal of the flash lamp which is releasably held in flash holder 37 between the arms 48, 52.

Figure 2:
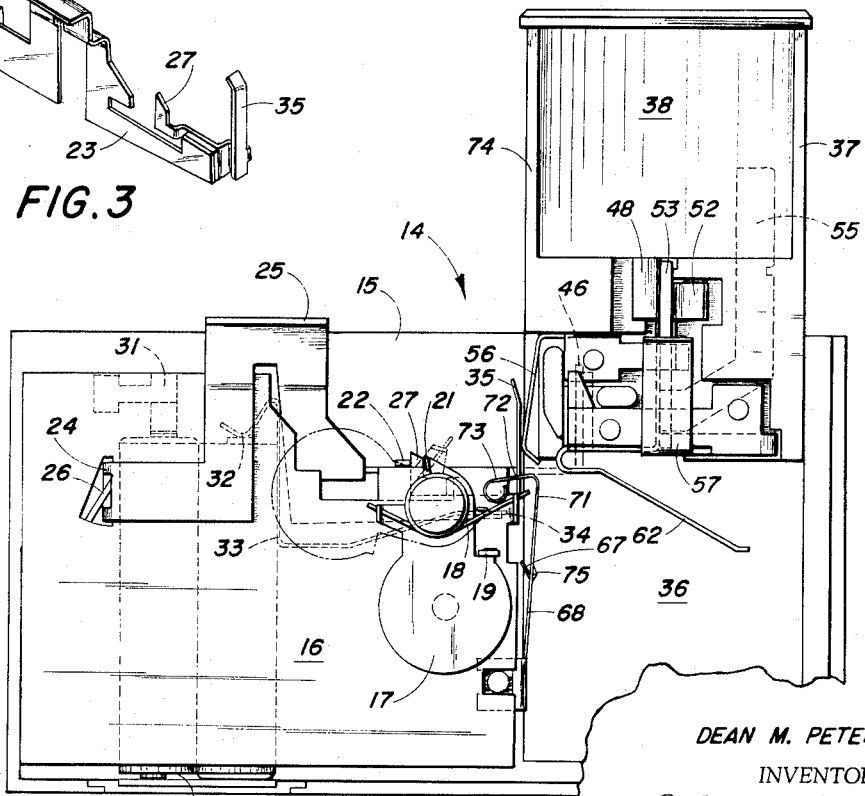
FIG. 2 is a view similar to FIG. 1 showing the flash holder in its extended position.

A bulb ejector is supported by flash holder 37 and comprises a pivotal plastic member 53 (see FIG. 7) extending between arms 48, 52 and having one end engaged by a spring arm 54 (see FIGS. 7, 8 and 11) for urging ejector 53 in a direction to expel a flash lamp from flash holder 37. When a flash lamp is inserted into flash holder 37, ejector 53 is moved or pushed back against the bias of spring 54 into the dotted position of FIG. 7, and the flash lamp is retained in this position by virtue of spring arm 48 which is stronger than ejector spring arm 54. To eject a flash lamp, an ejector arm 55 formed by bracket 41 (see FIG. 10) is manually moved by the operator in a direction withdrawing spring arm 48 and contact 51 from engagement with the base of the flash lamp whereupon ejector spring 54 urges ejector 53 into its full line position shown in FIG. 7 expelling the flash lamp. The opposite end of bracket 39 forms a spring arm 56 (see FIGS. 1, 2, 6 and 9) which in the extended position of flash holder 37, as seen in FIG. 2, engages contact member 35 secured to shutter trip member 23. Accordingly, with flash holder 37 in its extended position shown in FIGS. 2 and 5, flash lamp contact 51 is connected through bracket 41, arm 43, flange 46, mounting plate 16, and contact element 31 to one terminal of batteries 29. The other flash lamp contact 52 is connected through bracket 39 and arm 56 to shutter trip contact 35. When shutter trip member 23 is depressed, it moves contact 35 into electrical engagement with contact member 33, the opposite end 32 of which is connected to the other terminal of the batteries 29. Consequently, in this position of flash holder 37, the electrical circuit to the flash lamp is completed upon depression of shutter trip member 23 to make an exposure.

The flash holder 37 is releasably held in its retracted and extended positions by means of detents as best seen in FIG. 5. The detent for holding flash holder 37 in its extended position comprises the aforementioned bent end 44 of arm 43 co-acting with the notch 46' in flange 46. The flange 46 and arm 43 connection not only serves to complete the electrical path from a battery terminal to flash lamp contact 31 as mentioned heretofore, but in addition serves as a detent for holding unit 37 in an extended position. The bracket 42 (FIG. 11) further has a spring arm 57 adapted to bear against a surface 58 of a cover plate 59 (see FIG. 5) for urging flash holder 37 against back wall 47 of compartment 36. In the retracted position of flash holder 37, the end of arm 57 bears against an inclined shoulder 61 in cover plate 59 to releasably hold unit 37 in its retracted position, and to remove any endwise play in unit 37. The bracket 41 (FIG. 10) also has a spring arm 62 at the bottom of unit 37 which is tensioned when flash holder 37 is moved into its retracted position (see FIG. 1). A pivotal release arm 63 (see FIG. 5) struck out from an inner plate 64 secured to camera cover plate 59 has a finger portion 65 extending through an ornamental outer plate 66 and engageable by the operator from the exterior of the camera. The free end of arm 63 is in position to engage arm 57 when flash holder 37 is in its retracted position. To release flash holder 37 from its retracted position, the operator depresses finger portion 65 which urges spring arm 57 out of engagement with shoulder 61, allowing the tensioned spring 62 to slidably move flash holder 37 toward its extended position. The operator may then manually grasp and move flash holder 37 the remaining distance to its extended position. The spring arm 56 extending along the side of flash holder 37 serves the functions of urging flash holder 37 against one of the side walls of compartment 36 to eliminate side play in the flash holder, electrically connects flash compartment 52 to contact 35 when the flash holder is in the extended position, and acts as a cam for engaging a lip 67 (see FIGS. 1, 2, 12 and 13) of a shutter stop spring member 68 for caming member 68 into its operative position as flash holder 37 is moved from its extended to its retracted position.

The aforementioned shutter stop spring member 68 is a substantially inverted L-shaped member secured to camera body 15 by a pair of spring fingers 69 inserted into complementary slots between plate 16 and body 15. One arm 71 of member 68 extends partially into flash holder compartment 36 (see FIG. 2), and another arm 72 having a curved end 73 extends generally toward the pivot of shutter blade 17 and also lies in the plane of shutter blade lug 21. In the normal inoperative position of spring member 68 as seen in FIG. 2, the curved end 73 of arm 72 is out of engagement with shutter blade lug 21. When flash holder 37 is moved into its retracted position, the bent end of spring arm 56 engages lip 67 on member 68 and cams member 68 in a counterclockwise direction moving curved end 73 of arm 72 into the path of the shutter blade lug 21. As flash holder 37 is moved further towards its retracted position, a side wall 74 of flash unit 37 engages a projection 75 on member 68 and holds the member in its operative position as seen in FIG. 1. In this position, upon actuation of the shutter to make an exposure, lug 21 strikes the curved end 73 causing arms 71, 72 to deflect about projection 75 as a pivot as it absorbs the shock of the impact. This interception of lug 21 by member 68 results in a shortened shutter speed having a high order of repeatability without loss in accuracy.

Figure 13:
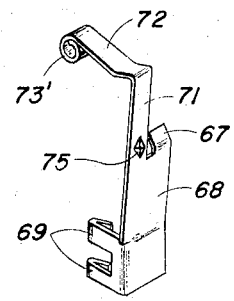
FIGS. 12 and 13 are perspective views of two spring members for achieving different shutter speeds.
Figure 12:
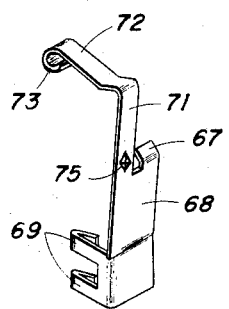

In manufacturing spring member 68 it is possible by the simple expedient of varying the angular distance through which the end 73 is turned to vary the shutter speed achieved by the member. In FIG. 13, the end 73' is turned through a greater angle than end 73 of FIG. 12 thereby reducing the length of arm 72. Consequently, blade lug 21 travels through a greater arc before it strikes end 73' resulting in a longer exposure. By varying the angle through which the end of arm 72 is turned, it is possible to achieve different shutter exposures varying at least between 1/60 and 1/100 seconds.

In the operation of this invention, when flash unit 37 is in its retracted position, spring arms 43, 56 are out of engagement with flange 46 and contact 35 respectively thereby effectively breaking the electrical circuit to flash lamp contacts 51, 52. This means that an unfired flash lamp may be left in the flash holder while daylight pictures are being taken without danger of the lamp being fired. Also, in this position, the side 74 of flash unit 37 holds spring member 68 in its operative position so that upon making an exposure, shutter lug 21 strikes the end 73 of arm 72 resulting in a shortened or faster exposure. The spring arm 71, 72 bend as a unit under the impact of shutter blade 17 absorbing the shock of the impact and becoming tensioned in the process. The tensioned spring arms 71, 72 then aid shutter blade spring 18 in rapidly returning shutter blade 17 to its original position. When flash unit 37 is moved to its extended position, spring arms 43, 56 are in engagement with flange 46 and contact 35 respectively to electrically connect flash lamp contacts to batteries 29. In addition, side 74 of flash unit 37 is out of engagement with spring member 68 which returns due to its inherent resilience to its original inoperative position. When shutter trip member 23 is depressed to make an exposure, shutter blade lug 21 does not engage spring end 73, and hence a longer exposure is obtained.

The invention has been described in detail with particular reference to a preferred embodiment thereof, but it will be understood that variations and modifications can be effected within the scope of the invention, as described hereinabove and as defined in the appended claims.

I claim:
1. In a flash camera, the combination comprising:
a shutter mechanism including a part which moves when the shutter operates to make an exposure and the extent of movement of which can be altered to achieve different shutter speeds;

a flash holder slidably mounted on said camera to move between retracted and extended positions; and a leaf spring having one end secured to said camera and its opposite end movable from a first position in which it restricts the movement of said part to a certain extent to achieve one shutter speed, to a second position in which it allows a greater movement of said part to achieve a slower shutter speed in response to movement of said flash holder from its retracted position to its extended position.

2. The invention according to claim 1 wherein said opposite end has a portion thereof turned through a predetermined angular distance.

3. In a flash camera, the combination comprising:
(A) a shutter mechanism including a part which moves when the shutter operates to make an exposure;
(B) a flash holder slidably mounted on said camera to move between retracted and extended positions;
(C) a spring responsive to movement of said flash holder and movable between a normal first position in which it is free of said movable part to achieve one shutter speed, and a second position in which it intercepts said movable part to achieve a different shutter speed and to absorb the shock of impact between said spring and part; and
(D) flash means for said camera including
(1) switch means movable between an operative position for illuminating the subject upon making an exposure, and an inoperative position for preventing illumination of the subject upon making an exposure, said switch means comprising
(a) a first contact on said camera, and
(b) a second contact on said flash holder, said flash holder when moved to said retracted position moving said second contact out of engagement with said first contact to place said switch means in its inoperative position, and moving said spring to its second position, and said flash holder when moved to said extended position moving said second contact into engagement with said first contact to place said switch means in its operative position, and releasing said spring which returns to its normal first position.

4. The invention according to claim 3 wherein said spring comprises a leaf spring having one end secured to said camera and its opposite end movable between said first and second positions.

5. The invention according to claim 4 wherein said opposite end has a portion thereof turned through a predetermined angular distance.

6. In a flash holder electrically connectable to and disconnectable from a camera upon movement of the flash holder relative to said camera between first and second positions respectively, the combination comprising:
(A) a housing supporting a semi-cylindrical reflector at one end, and having a slot at the other end;
(B) a first bracket secured to said housing and having
(1) a first spring arm extending into said slot, and
(2) a second spring arm for
(a) electrically connecting said first arm to said camera when said flash holder is in its first position, and
(b) urging said flash holder in a direction to eliminate said play between said flash holder and camera; and
(C) a second bracket secured to said housing and having
(1) a first spring arm extending into said slot and cooperating with said first arm of said first bracket to releasably hold a flash lamp therebetween, and
(2) a second spring arm for
(a) electrically connecting said first arm of said second bracket to said camera when said holder is in its first position, and
(b) cooperating with said camera to releasably hold said holder in its first position.

7. The invention according to claim 6 wherein said housing further has a third bracket secured thereto having a leaf spring cooperating with said camera to releasably hold said flash holder in its second position.

8. The invention according to claim 7 wherein said second bracket has a third spring arm that is tensioned when said flash holder is moved into its second position, said third spring arm urging said flash holder toward its first position when said flash holder is released by said leaf spring of said third bracket.

References Cited by the Examiner

UNITED STATES PATENTS

| 2,531,936 | 11/50 | Fairbank | 95—59 |
| 2,967,469 | 1/61 | Lachaize | 95—11 |
| 3,051,066 | 8/62 | Lareau | 95—11.5 |

NORTON ANSHER, *Primary Examiner.*

JOHN M. HORAN, *Examiner.*